United States Patent
Guo et al.

(10) Patent No.: US 10,833,919 B2
(45) Date of Patent: Nov. 10, 2020

(54) NODE DEVICE OPERATION METHOD, WORK STATUS SWITCHING APPARATUS, NODE DEVICE, AND MEDIUM

(71) Applicant: Tencent Technology (Shenzhen) Company Limited, Shenzhen (CN)

(72) Inventors: Rui Guo, Shenzhen (CN); Maocai Li, Shenzhen (CN); Jun Liang, Shenzhen (CN); Haitao Tu, Shenzhen (CN); Qi Zhao, Shenzhen (CN); Zongyou Wang, Shenzhen (CN); Jianjun Zhang, Shenzhen (CN); Dawei Zhu, Shenzhen (CN); Binhua Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

(21) Appl. No.: 16/510,723

(22) Filed: Jul. 12, 2019

(65) Prior Publication Data
US 2019/0342149 A1  Nov. 7, 2019

Related U.S. Application Data

(63) Continuation of application No. PCT/CN2018/083594, filed on Apr. 18, 2018.

(30) Foreign Application Priority Data

Apr. 20, 2017  (CN) .......................... 2017 1 0262463

(51) Int. Cl.
*H04L 12/24* (2006.01)
*H04L 29/08* (2006.01)

(52) U.S. Cl.
CPC ...... *H04L 41/0668* (2013.01); *H04L 67/1051* (2013.01); *H04L 67/1059* (2013.01)

(58) Field of Classification Search
None
See application file for complete search history.

(56) References Cited

U.S. PATENT DOCUMENTS 6,671,821 B1 *  12/2003  Castro .................. G06F 21/577
                                                    714/4.3
9,230,000 B1 *  1/2016  Hsieh .................. G06F 16/2343
(Continued)

FOREIGN PATENT DOCUMENTS

CN    103152434 A    6/2013
CN    104679796 A    6/2015
(Continued)

OTHER PUBLICATIONS

Tencent Technology, WO, PCT/CN2018/083594, Jul. 10, 2018, 4 pgs.
(Continued)

*Primary Examiner* — Philip J Chea
*Assistant Examiner* — Hassan A Khan
(74) *Attorney, Agent, or Firm* — Morgan, Lewis & Bockius LLP (57) ABSTRACT

This application discloses a node device operation method, a work status switching apparatus, a node device, and a medium, and relates to the field of network technologies. The method includes: receiving voting requests of a plurality of node devices, a quantity of the plurality of node devices being greater than half a quantity of node devices in a system; obtaining cycle length information and latest log indexes from the voting requests of the plurality of node devices if a current node device operates in a leader state; and switching a current work status from the leader state to a follower state or a candidate state if all the cycle length information in the voting requests of the plurality of node devices is greater than cycle length information of the current node device and all the latest log indexes in the (Continued)

voting requests of the plurality of node devices are not less than a latest log index of the current node device. This application enables that a first sub-cluster and a second sub-cluster can be combined into one system to work together, thereby improving the operational reliability of the system.

18 Claims, 5 Drawing Sheets

(56) References Cited

U.S. PATENT DOCUMENTS

2017/0339005 A1* 11/2017 Yuan .................. H04L 29/08
2020/0128076 A1* 4/2020 Yang .................. H04L 67/1097

FOREIGN PATENT DOCUMENTS

| CN | 104933132 A | 9/2015 |
| CN | 105511987 A | 4/2016 |
| CN | 105512266 A | 4/2016 |
| CN | 107105032 A | 8/2017 |
| WO | WO 2016127580 A1 | 8/2016 |

OTHER PUBLICATIONS

Tencent Technology, IPRP, PCT/CN2018/083594, Oct. 22, 2019, 5 pgs.
Tencent Technology, ISR, PCT/CN2018/083594, Jul. 10, 2018, 2 pgs.

* cited by examiner

NODE DEVICE OPERATION METHOD, WORK STATUS SWITCHING APPARATUS, NODE DEVICE, AND MEDIUM

CROSS-REFERENCE TO RELATED APPLICATIONS

This application is a continuation application of PCT/CN2018/083594, entitled "NODE DEVICE OPERATION METHOD, WORK STATUS SWITCHING APPARATUS, NODE DEVICE, AND MEDIUM" filed on Apr. 18, 2018, which claims priority to Chinese Patent Application No. 2017102624639, filed with the China National Intellectual Property Administration on Apr. 20, 2017 and entitled "NODE DEVICE OPERATION METHOD AND NODE DEVICE", all of which are incorporated by reference in their entirety.

FIELD OF THE TECHNOLOGY

This application relates to the field of network technologies, and in particular, to a node device operation method, a work status switching apparatus, a node device, and a medium.

BACKGROUND OF THE DISCLOSURE

With the development of network technologies, a manner of providing a service to a client based on a cluster becomes increasingly popular. To ensure consistency of all node devices in a cluster, Byzantine Fault Tolerance algorithm-Raft (BFT-Raft) can usually be used during operation of the node devices.

According to the BFT-Raft, a work status of a node device may include: a follower state follower, a candidate state candidate, and a leader state leader. When a random node device a is in a follower state, the node device a may determine, according to heartbeat information broadcast by a node device b in a leader state in the cluster, that the node device b operates normally, and copy a log based on an instruction from the node device b. When the node device a has not received the heartbeat information from the node device b within a period of time, the node device a may determine that the node device b is faulty, and the node device a may switch to a candidate state for operation, and broadcast a voting request to all the node devices in the cluster. Once receiving votes from at least a half of the node devices in the cluster, the node device a may switch to the leader state for operation. It should be noted that when the node device a in the leader state operates normally, if receiving a voting request or the heartbeat information, the node device a automatically ignores the voting request or the heartbeat information.

In a process of implementing this application, the inventor finds that the existing technology at least has the following problems.

A cluster may be split into two sub-clusters with their networks isolated, for example, a sub-cluster A and a sub-cluster B, where the sub-cluster A includes the node device a in the leader state in the cluster, and a quantity of node devices in the sub-cluster A is less than a quantity of node devices in the sub-cluster B. Therefore, the node devices in the sub-cluster B may select a new node device b in the leader state by voting. When the node device b is faulty, a node device in a candidate state in the sub-cluster B broadcasts the voting request again. If in this case, the sub-cluster A and the sub-cluster B restore a network connection, because the node device a operates normally, the voting request is ignored, that is, a node device c in the sub-cluster B is enabled to switch to the leader state for operation, and the node device a also ignores heartbeat information from the node device c. Consequently, the node device a cannot be combined with the sub-cluster B into one system to work together, and the operational reliability of the system is low.

SUMMARY

Embodiments of this application provide a node device operation method, a work status switching apparatus, a node device, and a medium, to resolve a problem of low operational reliability. The technical solutions are as follows:

According to a first aspect of this application, a node device operation method is performed at a first node device having one or more processors and memory storing a plurality of programs to be executed by the one or more processors, wherein the first node device is a member of a network system of node devices, the method comprising:

receiving, by the first node device, voting requests from a plurality of second node devices, a quantity of the plurality of second node devices being greater than half of a quantity of node devices among the network system of node devices;

when the first node device operates in a leader state, obtaining, by the first node device, cycle length information and latest log indexes from the voting requests of the plurality of second node devices; and switching, by the first node device, a work status of the first node device from the leader state to a follower state or a candidate state when (i) all the cycle length information in the voting requests of the plurality of second node devices is greater than cycle length information of the first node device and (ii) all the latest log indexes in the voting requests of the plurality of second node devices are not less than a latest log index of the first node device.

According to a second aspect of this application, a first node device has one or more processors, memory coupled to the one or more processors and a plurality of programs stored in the memory. The plurality of programs, when executed by the one or more processors, cause the first node device to perform the aforementioned node device operation method.

According to a third aspect of this application, a computer readable storage medium is provided. The computer readable storage medium stores a plurality of machine readable instructions in connection with a first node device having one or more processors. The plurality of machine readable instructions, when executed by the one or more processors, cause the first node device to perform the aforementioned node device operation method.

In the embodiments of this application, in a scenario in which a system is split and then is back to normal, when receiving a plurality of voting requests, a node device obtains cycle length information and latest log indexes in the voting requests; and operates in a follower state or a candidate state if all the obtained cycle length information is greater than cycle length information of a current node device and all the newest obtained logs are not less than a latest log index of the current node device, so that a node device operating in a leader state in first sub-cluster may be degraded to the follower state or the candidate state, and further, any node device in the first sub-cluster may participate in election together with a node device in a second sub-cluster. The first sub-cluster and the second sub-cluster can be combined into one system again to work together until a new node device in the leader state appears, thereby improving the operational reliability of the system.

BRIEF DESCRIPTION OF THE DRAWINGS

To describe the technical solutions in embodiments of this application more clearly, the following briefly describes the accompanying drawings required for describing the embodiments. Apparently, the accompanying drawings in the following description show merely some embodiments of this application, and a person of ordinary skill in the art may still derive other drawings from these accompanying drawings without creative efforts.

DESCRIPTION OF EMBODIMENTS

To make objectives, technical solutions, and advantages of this application clearer, the following further describes in detail implementations of this application with reference to the accompanying drawings.

Figure 1A:
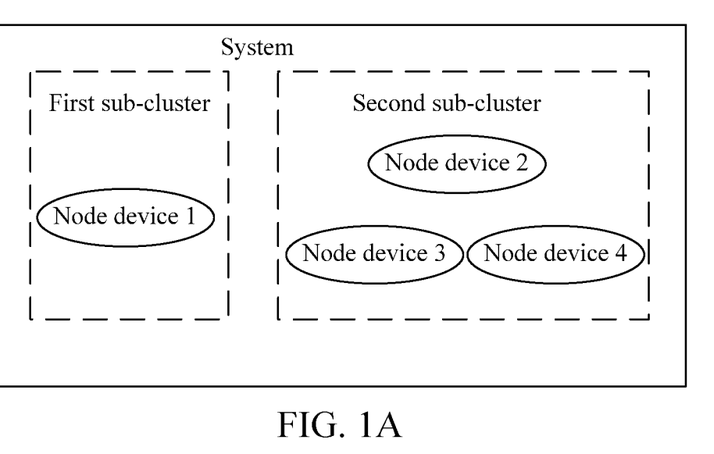
FIG. 1A is a schematic diagram of an implementation environment in which a node device operates according to an embodiment of this application.

FIG. 1A is a schematic diagram of an implementation environment in which a node device operates according to an embodiment of this application. Referring to FIG. 1A, the implementation environment is a system including a plurality of node devices. The system is also equivalent to a cluster. The node device 1 is a node device operating in a leader state in the system. When operating normally, the node device 1 may regularly broadcast heartbeat information to all node devices operating in a follower state, for example, a node device 2, a node device 3, and a node device 4. When receiving the heartbeat information, each node device operating in the follower state may determine that the node device 1 operates normally, and reset a timer (which is generally set to a random value from 0.5 seconds to 1 second, and in which way, it may be avoided that timers of all node devices have the same timing lengths and repeated election is caused), to wait for a next piece of heartbeat information.

Figure 1B:
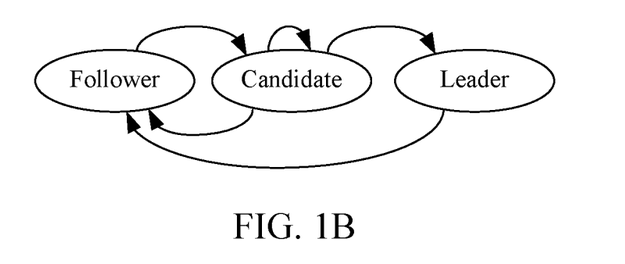
FIG. 1B is a schematic diagram of work status switching of a node device according to an embodiment of this application.

In fact, a work status of each node device in the system may be dynamically switched. FIG. 1B is a schematic diagram of work status switching of a node device according to an embodiment of this application. Once a node device operating in a follower state (follower) has not received heartbeat information when a timer expires, the node device may determine that a node device operating in a leader state is faulty, and may be switched to a candidate state (candidate) for operation. Further, the node device may reset the timer, broadcasts a voting request, and is switched to the leader state (leader) for operation until at least half a quantity of voting acknowledge messages in the system are received, or is switched to the follower state for operation when receiving heartbeat information from a node device operating in the leader state, or keeps in the candidate state and starts a new round of election when the timer expires. The node device operating in the leader state may be switched to the follower state for operation when finding a node device having higher cycle length information (term).

When the system provides a service to a client, and when any node device in the system receives a service command of the client, the node device may redirect the service command to the node device 1. The node device 1 broadcasts a log add request to each node device, where the log add request is used to request to add the service command to a log. If the node device 1 may receive an acknowledgment message from each node device for the log add request, the node device 1 may add the service command to the log in response to the service command of the client, and broadcast a log copy instruction to each node device, so that each node device copies the service command to the log. In an actual application scenario, the system may be a transaction system based on a blockchain technology on a bottom layer, the service command may be transaction information of the client, and a log stored in each node device may correspond to one blockchain. When transaction information is added to a log, the transaction information is actually stored in a next block of a current block. Because data stored in a blockchain cannot be changed, tampering on the transaction information can be effectively avoided, and the security of the transaction information is improved.

Due to causes such as network interruption, the system may be split, node devices in the system may form two sub-clusters with their networks isolated, namely, a first sub-cluster and a second sub-cluster, a quantity of node devices in the first sub-cluster is less than a quantity of node devices in the second sub-cluster, and the first sub-cluster includes a node 1 operating in the leader state in the system. Further, a node device operating in the follower state in the first sub-cluster may continue operating normally according to the heartbeat information regularly broadcast by the node device 1. Due to network interruption from the node device 1, a node device operating in the follower state in the second sub-cluster cannot receive the heartbeat information from the node device 1 when the timer expires. According to a BFT-Raft timeout election mechanism, a node device operating in the follower state is to be switched to the candidate state for operation, adds one piece of cycle length information thereof, and broadcasts a voting request. A node device, in the second sub-cluster, receiving voting requests of more than half of the quantity of node devices in the system may be switched to the leader state for operation, and broadcast heartbeat information of the node device, where the heartbeat information carries cycle length information of the node device operating in the leader state. When receiving the heartbeat information, a node operating in the candidate state may be switched to the follower state for operation, and synchronizes cycle length information thereof as the cycle length information carried in the heartbeat information. When the node device operating in the leader state in the second sub-cluster is faulty, each node device in the second sub-cluster is to be switched to the candidate state for operation, and performs election again. If in a process in which the second sub-cluster performs election, the first sub-cluster and the second sub-cluster restore a network connection, because the node device 1 in the first sub-cluster operates normally, each node device in the first sub-cluster ignores the voting requests from the node devices in the second sub-cluster. Even if a new node device in the leader state is selected from the second sub-cluster, and the node device in the second sub-cluster may operate according to heartbeat information of the new node device in the leader state, each node device in the first sub-cluster ignores the heartbeat information of the new node device in the leader state, and continues operating according to the heartbeat information of the node device 1. Consequently, the first sub-cluster and the second sub-cluster cannot be restored to one system to work together, and the operational reliability of the system is low.

Figure 2:
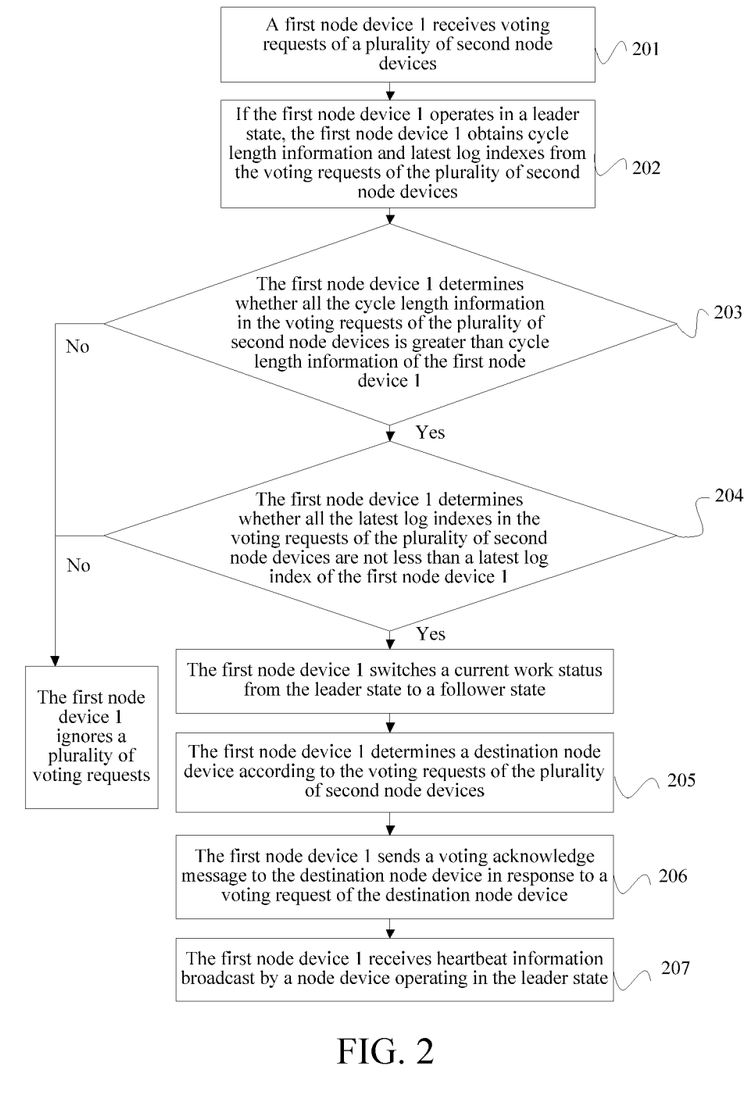
FIG. 2 is a flowchart of a node device operation method according to an embodiment of this application.

FIG. 2 is a flowchart of a node device operation method according to an embodiment of this application. Referring to FIG. 2, the method may be applied to the first node device 1 in the embodiment shown in FIG. 1A, including the following steps:

201. The first node device receives voting requests of a plurality of second node devices, a quantity of the plurality of second node devices being greater than half of a quantity of node devices in a system.

The plurality of second node devices may be node devices in the second sub-cluster in the embodiment shown in FIG. 1A. Because an original node device in the leader state in the second sub-cluster is faulty, and the plurality of second node devices has not received heartbeat information when timers thereof expire, some or all the plurality of second node devices in the second sub-cluster are operating in a candidate state, generate voting requests based on information such as cycle length information, latest log indexes, and node device identifiers thereof, and broadcast the voting requests to all node devices in the system. Generally, a node device receiving the voting request determines whether the heartbeat information is received before the timer expires; and if yes, determines that the node device in the leader state operates normally, and ignores the voting request; or if not, extracts cycle length information and a latest log index in the voting request, and compares the extracted information with own information; and if the two pieces of information are greater than or equal to own information, sends a voting acknowledge message to a node device corresponding to a node device identifier in the voting request; or otherwise, ignores the voting request. Once a node device is voted, another node device will not be voted within this operation cycle. Certainly, if it is the node device operating in the leader state that receives the voting request, the voting request is automatically ignored. In this embodiment of this application, to enable the node device operating in the leader state in the first sub-cluster to be combined with the second sub-cluster into one system to work together, so as to improve the operational reliability of the clusters, the following steps are performed.

Considering a situation that one or a few voting requests are received may be caused by node devices disguised as being in the candidate state, this situation needs to excluded. In addition, to confirm whether the system is currently in such a situation: a network connection between sub-clusters obtained after splitting has been restored, and the node device in the second sub-cluster is performing election. The node device needs to restrict a quantity of received voting requests, to be specific, voting requests from more than half the quantity of node devices in the system need to be received.

In an actual scenario, because each round of election is time-limited, this step may be specifically: after receiving a first voting request, starting, by the first node device 1, a timer for timing; and during operation of the timer, continuing receiving a voting request of another node device, and stopping receiving a voting request until the timer expires. That is, the first node device 1 may receive a voting request within timing duration of the timer. The timing duration may be duration of a round of election. If a quantity of voting requests received by the first node device 1 within the timing duration is greater than half of the quantity of node devices in the system, it indicates that the system has been split, the first sub-cluster and the second sub-cluster have restored the network connection, and the second sub-cluster is performing election, and therefore, the first node device 1 performs step 202; otherwise, the foregoing situation cannot be confirmed, the first node device 1 may directly ignore the received voting request, and continue broadcasting the heartbeat information.

202. The first node device 1 obtains cycle length information and latest log indexes from the voting requests of the plurality of second node devices if the first node device 1 operates in a leader state.

The cycle length information is an operation cycle number at which the node device sending the voting request is currently located. Each time election is performed, one piece of cycle length information is added to a node device switched from the follower state to the candidate state. The node device finally in the leader state may add the cycle length information to heartbeat information and broadcast the heartbeat information to another node device. The node device in the candidate state receiving the heartbeat information may be switched to the follower state for operation, synchronizes its own cycle length information as the cycle length information in the heartbeat information, may determine, according to its own latest log index and a latest log index in the heartbeat information, a log that the node device in the candidate state does not have, and requests the node device in the leader state to return the log that the node device in the candidate state does not have. Therefore, the cycle length information may indicate whether a node device is always synchronized with the node device operating in the leader state and operates normally.

The latest log index is an index of a log newly stored by the node device sending the voting request, each time after the node device operating in the leader state adds a new log, one latest log index is also added. Moreover, the node device operating in the leader state may broadcast a log copy instruction to another node device, so that the node device receiving the log copy instruction may synchronize the log and the latest log index of the node device in the leader state. Therefore, the latest log index may indicate log integrity of a node device. Obviously, the leader state operating in the node device is a node device having the best log integrity in the system.

In this step, the first node device 1 may respectively extract, from the voting requests, cycle length information and latest log index at corresponding protocol field positions according to protocol field positions of cycle length information and latest log index in the voting requests.

203. The first node device 1 determines whether all the cycle length information in the voting requests of the plurality of second node devices is greater than cycle length information of the first node device 1; and if yes, performs step 204; or if not, ignores a plurality of voting requests.

In this step, to further confirm an implementation scenario in which the system has been split, the node device in the leader state that is selected by the second sub-cluster after the splitting is faulty, the first sub-cluster and the second sub-cluster have restored the network connection, and the second sub-cluster is performing election, considering that the second sub-cluster has performed a round of election after the splitting, the cycle length information of the second node devices in the second sub-cluster is one piece more than the cycle length information in the first sub-cluster. Therefore, the cycle length information may be used as one of the basis for confirming the foregoing implementation scenario. If all the cycle length information in the voting requests is greater than the cycle length information of the first node device 1, the foregoing implementation scenario is confirmed, step 204 continues to be performed. If the cycle length information in the voting requests is not greater than the cycle length information of the first node device 1, it indicates that node devices corresponding to the voting requests may be faulty, and the foregoing implementation scenario is not conformed. Therefore, the first node device 1 may ignore the plurality of voting requests, and continues broadcasting the heartbeat information.

204. The first node device 1 determines whether all the latest log indexes in the voting requests of the plurality of second node devices are not less than a latest log index of the first node device 1; and if yes, switch a current work status from the leader state to a follower state; or if not, ignores the plurality of voting requests.

Considering that before the system is split, logs of node devices in the system should be synchronized with a log of the first node device 1, after the second sub-cluster serves a client for a period of time, when the two sub-clusters restore the network connection, logs stored in node devices in the second sub-cluster should not be less than logs stored in node devices in the first sub-cluster. Therefore, the latest log index may be used as one of the basis for confirming the foregoing implementation scenario. If all the latest log indexes in the voting requests of the plurality of second node devices are not less than the latest log index of the first node device 1, it indicates that a quantity of logs already stored in the node devices corresponding to the voting requests is equal to or greater than a quantity of logs of the first node device 1. The foregoing implementation scenario is finally confirmed by various basis. Therefore, the first node device 1 is switched to the follower state for operation, and stops broadcasting the heartbeat information. If the latest log indexes in the voting requests are less than the latest log index of the first node device 1, the foregoing implementation scenario is not confirmed, the first node device 1 may ignore the plurality of voting requests, and continues broadcasting the heartbeat information.

When switched to the follower state for operation, the first node device 1 may stop broadcasting the heartbeat information, resets the timer, and waits for heartbeat information of a new node device in the leader state. If the first node device 1 has not received heartbeat information before the timer expires, the first node device 1 may be switched to the candidate state for operation, broadcasts a voting request, and is switched to the follower state for operation until the first node device 1 is in the leader state or receives the heartbeat information from the new node device in the leader state.

In fact, the first node device 1 may alternatively switch the current work status to the candidate state for operation, stops broadcasting the heartbeat information, broadcasts the voting request, and is switched to the follower state for operation until the first node device 1 is in the leader state or receives the heartbeat information from the new node device in the leader state.

It should be noted that once the first node device 1 stops broadcasting the heartbeat information, the node device operating in the follower state in the first sub-cluster may be automatically switched to the candidate state for operation after the timer expires, and is switched to the follower state for operation until the first node device 1 becomes a node device in the leader state in the system or receives the heartbeat information from the node device operating in the leader state in the system. Therefore, the node device operation method may further enable the first sub-cluster and the second sub-cluster to restore to the original system for operation, thereby improving the operational reliability of the system.

In addition, it should be noted that, in this embodiment of this application, an order in which the first node device 1 performs step 203 and step 204 is not specifically limited. In fact, the first node device 1 may alternatively determine the latest log index first, and then determine the cycle length information. Alternatively, to improve the efficiency of determining, and enable the first sub-cluster and the second sub-cluster to be combined into one system for operation, the first node device 1 may simultaneously determine and the latest log index and the cycle length information. The first node device 1 may switch the current work status to the follower state (or the candidate state) provided that the latest log index and the cycle length information respectively satisfy the foregoing determining conditions.

In the embodiments of this application, when receiving a plurality of voting requests, a node device obtains cycle length information and newest log indexes in the voting requests; and operates in the follower state or the candidate state if all the obtained cycle length information is greater than cycle length information of a current node device and all the newest obtained logs are not less than a newest log index of the current node device, so that a node device operating in a leader state in first sub-cluster may be degraded to the follower state or the candidate state, and further, any node device in the first sub-cluster may participate in election together with a node device in the second sub-cluster. The first sub-cluster and the second sub-cluster can be combined into one system again to work together until a new node device in the leader state appears, thereby improving the operational reliability of the system.

205. The first node device 1 determines a destination node device according to the voting requests of the plurality of second node devices.

The destination node device is the second node device for which the first node device 1 tends to vote. In this step, after the determining process of step 203 and step 204, for the first node device 1, a second node device corresponding to any voting request meets the requirement of becoming the node device in the leader state. Therefore, the first node device 1 may use a node device corresponding to a voting request having a prior receiving order as the destination node device according to receiving orders of the voting requests. Certainly, the first node device 1 may use another determining method when determining the destination node device. This is not specifically limited in this embodiment of this application.

206. The first node device 1 sends a voting acknowledge message to the destination node device in response to a voting request of the destination node device.

In this step, the first node device 1 may generate a voting acknowledge message based on a node device identifier of the first node device 1, and send the voting acknowledge message to the destination node device according to a node device identifier of the destination node device.

Certainly, to enable that the destination node device can authenticate an identity of a voter, and improve the system security, the first node device 1 may send a voting acknowledge message carrying a signature to the destination node device. Each node device in the system may be configured with a private key of the node device and public key of all node devices. Therefore, when receiving the voting acknowledge message, the destination node device may extract the signature of the first node device 1, and authenticate the signature of the first node device 1 by using a configured public key of the first node device 1.

It should be noted that, step 205 and step 206 are optional steps of this embodiment of this application. In fact, because the quantity of node devices in the second sub-cluster is greater than half the quantity of node devices in the system, a node device in the leader state can still be selected from the system without a response from the first node device 1 to any voting request, and when heartbeat information of the node device in the leader state is received, cycle length information of the system is synchronized as cycle length information carried in the heartbeat information, so that the first sub-cluster is combined with the second sub-cluster into one system for operation.

207. The first node device 1 receives heartbeat information broadcast by the node device operating in the leader state.

One any node device in the candidate state in the system receives more than half a quantity of voting acknowledge messages from the node devices in the system, the node device in the candidate state may be switched to the leader state for operation, and broadcast heartbeat information thereof, so that the first node device 1 may receive the heartbeat information.

To prevent some node devices from disguising into node devices in the leader state and improve the system security, the heartbeat information may carry a signature that is of each node device in the system and that is generated when each node device responds to the voting request for switching to the node device in the leader state. Therefore, when receiving the heartbeat information, the first node device 1 may extract the signature of each node device, and authenticate the signature of the node device by using a configured public key of any node device. If authentication on signatures of all node devices succeeds, and a quantity of the signatures on which authentication succeeds is greater than half the quantity of node devices in the system, it indicates that the heartbeat information is indeed from the node device operating in the leader state, and the first node device 1 may reset the timer, and wait for next heartbeat information.

In fact, to ensure the consistency of the system, the node device operating in the leader state may broadcast a log copy instruction, so that the first node device 1 may receive the log copy instruction broadcast by the node device operating in the leader state, and copy a log based on the log copy instruction, to add a service instruction newly received by the system to the log. Certainly, based on the BFT-Raft, not only the problem of consistency of the node device is resolved, but also problems of node device fraud, data tampering, data losses, and out-of-order data are resolved. The log copy instruction needs to carry the signature that is of each node device in the system and that is generated in response to the voting request of the node device operating in the leader state, so that the first node device 1 may authenticate the log copy instruction, and copy a log after the authentication succeeds.

The following describes in detail a work situation of the system after the first node device 1 is switched to the follower state (or the candidate state):

When switched to the follower state (or the candidate state) for operation, because the first node device 1 stops broadcasting the heartbeat information, a node device operating in the follower state in the first sub-cluster has not received the heartbeat information before the timer expires, and therefore, is switched to the candidate state for operation.

If in this case, election in the second sub-cluster does not end yet, the node device switched to the candidate state in the first sub-cluster is equivalent to participating in the election together with the node devices in the second sub-cluster. When any node device receives more than half a quantity of votes of the node devices in the system, the node device may be switched to the leader state for operation, and broadcasts the heartbeat information. When another node device in the system receives the heartbeat information, it may be determined that the election ends, and the node device is switched to the follower state, synchronizes cycle length information thereof with cycle length information of the heartbeat information, and subsequently, may perform an operation based on the heartbeat information of the node device in the leader state, the log copy instruction, or the like.

If after the node device operating in the follower state in the first sub-cluster is switched to the candidate state, election in the second sub-cluster already ends, the node device changes to the leader state in the second sub-cluster may regularly broadcast the heartbeat information. The node device used to operate in the candidate state in the second sub-cluster may be switched to the follower state when receiving the heartbeat information for the first time, and synchronizes cycle length information thereof with the cycle length information in the heartbeat information. Because the first sub-cluster does not have a node device in the leader state, the node device operating in the follower state may keep the follower state when receiving the heartbeat information for the first time, and synchronizes the cycle length information thereof with the cycle length information in the heartbeat information. The node device operating in the candidate state may be switched to the follower state when receiving the heartbeat information for the first time, and synchronizes the cycle length information thereof with the cycle length information in the heartbeat information.

Figure 3:
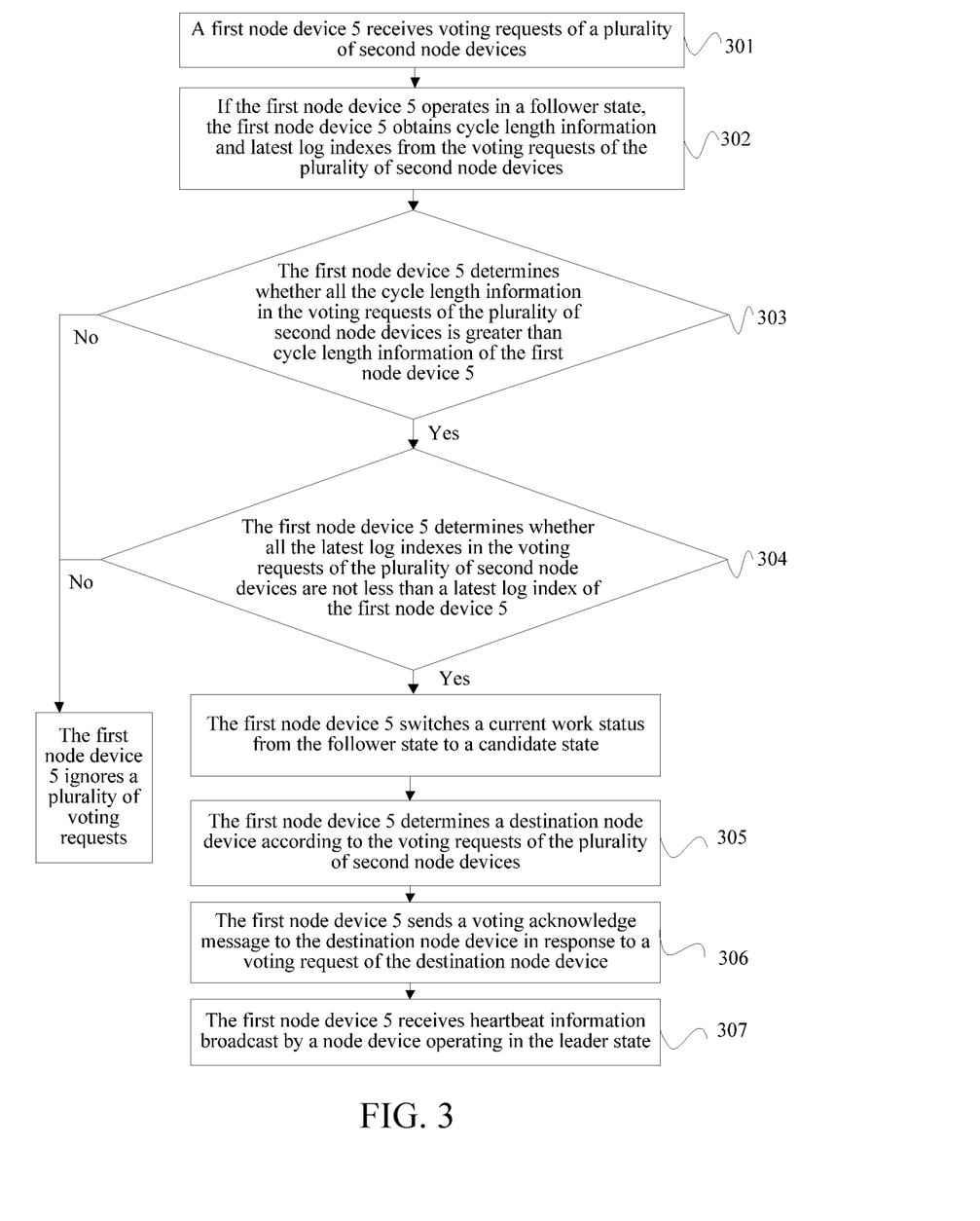
FIG. 3 is a flowchart of a node device operation method according to an embodiment of this application.

In the embodiment in FIG. 2, an example in which the first node device 1 operating in the leader state in the first sub-cluster is the execution body is used for description. After the first node device 1 stops broadcasting the heartbeat information, a node device (referred to as a first node device 5) operating in the follower state in the first sub-cluster may be actively combined with the second sub-cluster into one system. In fact, to enable that the first node device 5 can be highly efficiently combined with the second sub-cluster into one system for operation and improve the cluster reliability, a node device operation method provided in an embodiment of this application may be applied to the first node device 5. For example, FIG. 3 is a flowchart of a node device operation method according to an embodiment of this application. Referring to FIG. 3, the method includes the following steps:

301. A first node device 5 receives voting requests of a plurality of second node devices, a quantity of the plurality of second node devices being greater than half a quantity of node devices in a system.

Step 301 is similar to step 201, and details are not described herein again.

302. If the first node device 5 operates in a follower state, the first node device 5 obtains cycle length information and latest log indexes from the voting requests of the plurality of second node devices.

Step 302 is similar to step 202, and details are not described herein again.

303. The first node device 5 determines whether all the cycle length information in the voting requests of the plurality of second node devices is greater than cycle length information of the first node device 5; and if yes, performs step 304; or if not, ignores a plurality of voting requests.

Step 303 is similar to step 203, and details are not described herein again.

304. The first node device 5 determines whether all the latest log indexes in the voting requests of the plurality of second node devices are not less than a latest log index of the first node device 5; if yes, switches a current work status from the follower state to a candidate state; or if not, ignores the plurality of voting requests.

Step 304 is similar to step 204, except that the first node device 5 needs to switch to the candidate state, broadcasts a voting request, and switches to the follower state until receiving heartbeat information from a new node device in a leader state, or switches to the leader state until receiving more than half a quantity of voting requests of node devices in the system.

Certainly, the first node device 5 may alternatively keep the follower state, may automatically switch to the candidate state when a timer expires, and switches to the follower state until receiving the heartbeat information from the new node device in the leader state, or switches to the leader state until receiving more than half the quantity of voting requests of the node devices in the system.

In this embodiment of this application, when the plurality of voting requests is received, the cycle length information and the latest log indexes in the voting requests are obtained. If all the obtained cycle length information is greater than cycle length information of a current node device, and all the obtained latest log indexes are not less than a latest log index of the current node device, a node device operates in the follower state or the candidate state, so that a node device operating in the leader state in a first sub-cluster may be degraded to the follower state or the candidate state, and further, all the node devices in the first sub-cluster may participate in election together with node devices in a second sub-cluster, the first sub-cluster may be combined with the second sub-cluster into one system to work together until a new node device in the leader state appears, thereby improving the operational reliability of the system.

305. The first node device 5 determines a destination node device according to the voting requests of the plurality of second node devices.

Step 305 is similar to step 205, and details are not described herein again.

306. The first node device 5 sends a voting acknowledge message to the destination node device in response to a voting request of the destination node device.

Step 306 is similar to step 206, and details are not described herein again.

307. The first node device 5 receives heartbeat information broadcast by the node device operating in the leader state.

Step 307 is similar to step 207, and details are not described herein again.

Certainly, the node device may alternatively continue participating in the election, to ensure the justice of the overall election of the system.

Figure 4:
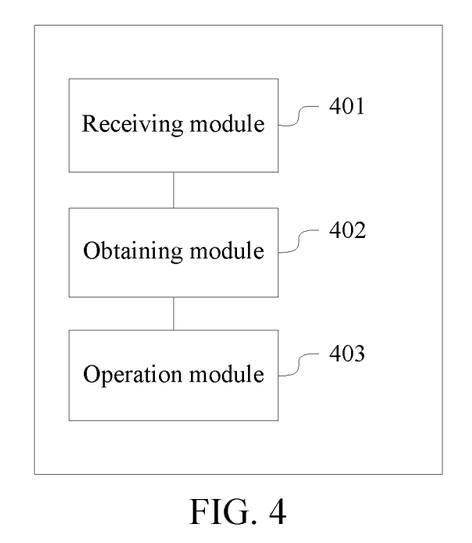
FIG. 4 is a schematic diagram of modules of a work status switching apparatus according to an embodiment of this application.

FIG. 4 is a schematic diagram of modules of a work status switching apparatus according to an embodiment of this application. The work status switching apparatus is applied to a first node device. Referring to FIG. 4, the apparatus includes:

a receiving module 401, configured to receive voting requests of a plurality of second node devices, a quantity of the plurality of second node devices being greater than half of a quantity of node devices in a system;

an obtaining module 402, configured to obtain cycle length information and latest log indexes from the voting requests of the plurality of second node devices if the first node device operates in a leader state; and an operation module 403, configured to switch a work status of the first node device from the leader state to a follower state or a candidate state if all the cycle length information in the voting requests of the plurality of second node devices is greater than cycle length information of the first node device and all the latest log indexes in the voting requests of the plurality of second node devices are not less than a latest log index of the first node device.

In this embodiment of this application, when the plurality of voting requests is received, the cycle length information and the latest log indexes in the voting requests are obtained. If all the obtained cycle length information is greater than the cycle length information of the first node device, and all the obtained latest log indexes are not less than the latest log index of the first node device, a node device operates in the follower state or the candidate state, so that a node device operating in the leader state in a first sub-cluster may be degraded to the follower state or the candidate state, and further, all the node devices in the first sub-cluster may participate in election together with node devices in a second sub-cluster, the first sub-cluster may be combined with the second sub-cluster into one system to work together until a new node device in the leader state appears, thereby improving the operational reliability of the system.

In a possible implementation, the receiving module 401 is configured to: after a first voting request is received, start a timer for timing; and during an operation process of the timer, continue receiving a voting request, and stop receiving a voting request until the timer expires.

In a possible implementation, the obtaining module 402 is further configured to obtain the cycle length information and the latest log indexes from the voting requests of the plurality of second node devices if the first node device operates in the follower state; and the operation module 403 is further configured to switch the work status of the first node device from the follower state to a candidate state or keep the follower state if all the cycle length information in the voting requests of the plurality of second node devices is greater than the cycle length information of the first node device and all the latest log indexes in the voting requests of the plurality of second node devices are not less than the latest log index of the first node device.

Figure 5:
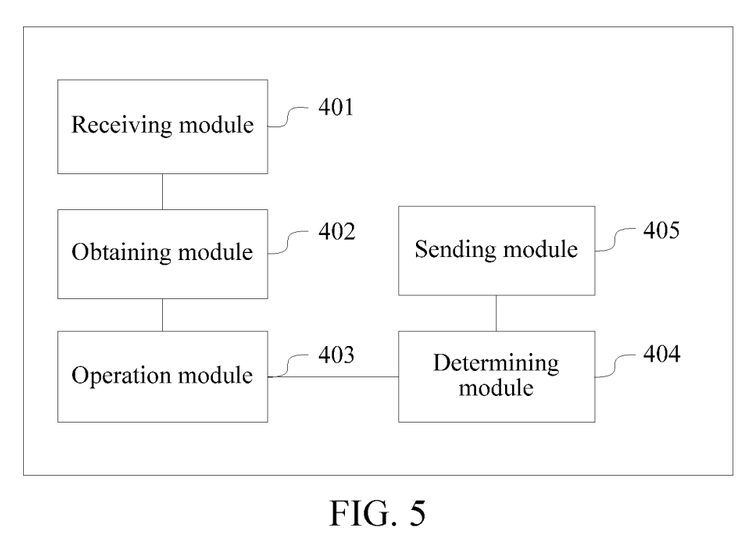
FIG. 5 is a schematic diagram of modules of a work status switching apparatus according to an embodiment of this application.

In a possible implementation, based on the apparatus composition in FIG. 4, referring to FIG. 5, the node device further includes:

a determining module 404, configured to determine a destination node device according to the voting requests of the plurality of second node devices; and a sending module 405, configured to send a voting acknowledge message to the destination node device in response to a voting request of the destination node device.

In a possible implementation, the receiving module 401 is further configured to receive heartbeat information broadcast by a node device operating in the leader state; or the receiving module 401 is further configured to receive a log copy instruction broadcast by a node device operating in the leader state, and copy a log based on the log copy instruction.

An optional embodiment of this application may be formed by using any combination of all the foregoing optional technical solutions, and details are not described herein.

It should be noted that, when the apparatus provided in the foregoing embodiments performs the node device operation method, only an example of division of the foregoing functional modules is used for description, and in actual application, the foregoing functions may be accomplished by different functional modules as required, that is, the internal structure of the apparatus is divided into different functional modules, to accomplish all or some functions in the foregoing descriptions. In addition, the apparatus provided in the foregoing embodiments is based on the same concept as the node device operation method in the foregoing embodiments. For details about a implementation process, refer to the method embodiments, and the details are not described herein again.

Figure 6:
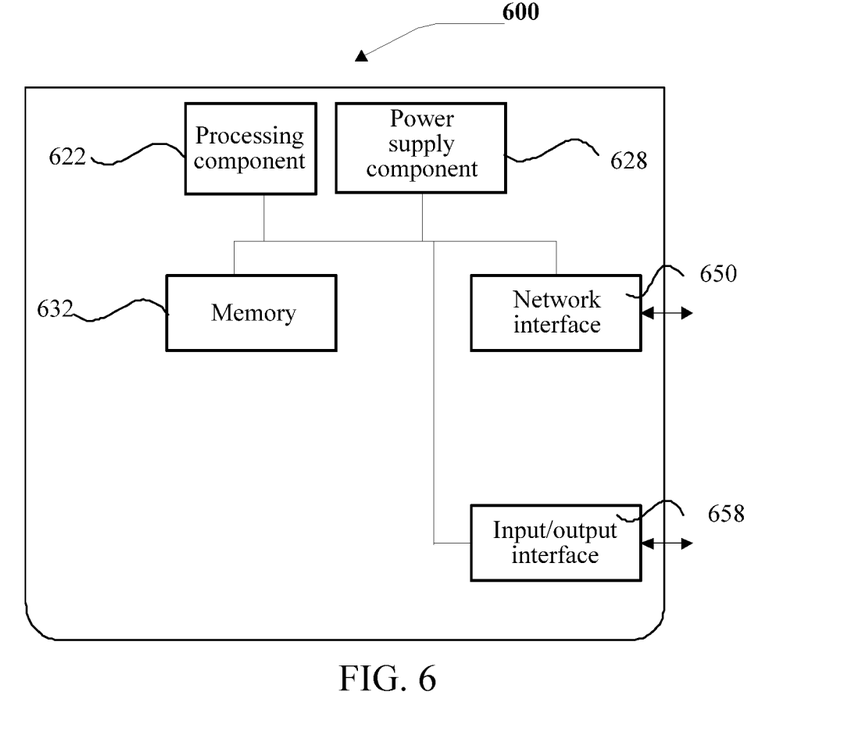
FIG. 6 is a schematic structural diagram of a node device according to an embodiment of this application.

FIG. 6 is a schematic structural diagram of a node device according to an embodiment of the present invention. Referring to FIG. 6, the node device 600 may be provided as a server. The node device 600 includes a processing component 622, and further includes one or more processors, and memory resources represented by a memory 632, configured to store instructions that may be executed by the processing component 622, for example, an application program. The application program stored in the memory 632 may include one or more modules, each of which corresponds to a set of instructions. In addition, the processing component 622 is configured to execute instructions, to perform the following node device operation method:

receiving voting requests of a plurality of node devices, a quantity of the plurality of node devices being greater than half a quantity of node devices in a system;

obtaining cycle length information and latest log indexes from the voting requests of the plurality of node devices if the node device operates in a leader state; and switching a work status of the node device from the leader state to a follower state or a candidate state if all the cycle length information in the voting requests of the plurality of node devices is greater than cycle length information of the node device and all the latest log indexes in the voting requests of the plurality of node devices are not less than a latest log index of the node device.

In a possible implementation, the one or more processors are configured to execute the instructions, to perform the following steps:

after a first voting request is received, starting a timer for timing; and during an operation process of the timer, continuing receiving a voting request, and stopping receiving a voting request until the timer expires.

In a possible implementation, the one or more processors are configured to execute the instructions, to perform the following steps:

obtaining the cycle length information and the latest log indexes from the voting requests of the plurality of node devices if the node device operates in the follower state; and switching a work status of the node device from the follower state to a candidate state or keeping the follower state if all the cycle length information in the voting requests of the plurality of node devices is greater than the cycle length information of the node device and all the latest log indexes in the voting requests of the plurality of node devices are not less than the latest log index of the node device.

In a possible implementation, the one or more processors are configured to execute the instructions, to perform the following steps:

determining a destination node device according to the voting requests of the plurality of node devices; and sending a voting acknowledge message to the destination node device in response to a voting request of the destination node device.

In a possible implementation, the one or more processors are configured to execute the instructions, to perform the following steps:

receiving heartbeat information broadcast by a node device operating in the leader state; or receiving a log copy instruction broadcast by a node device operating in the leader state, and copying a log based on the log copy instruction.

The node device 600 may further include: a power supply component 626, configured to perform power supply management on the node device 600; a wired or wireless network interface 650, configured to connect the node device 600 to a network; and an input/output (I/O) interface 658. The node device 600 may operate an operating system stored in the memory 632, for example, Windows Server™, Mac OS X™, Unix™, Linux™, or FreeBSD™.

In an exemplary embodiment, a computer readable storage medium is further provided. The computer readable storage medium stores instructions, and the instructions may be executed by a processor in a device to perform the node device operation method in the foregoing embodiments. For example, the computer readable storage medium may be a ROM, a random access memory (RAM), a CD-ROM, a magnetic tape, a floppy disk, an optical data storage device, or the like.

A person of ordinary skill in the art may understand that all or some of the steps of the foregoing embodiments may be implemented by using hardware, or may be implemented by a program instructing relevant hardware. The program may be stored in a computer readable storage medium. The storage medium may be a ROM, a magnetic disk, an optical disc, or the like.

The foregoing descriptions are merely preferred embodiments of this application, but are not intended to limit this application. Any modification, equivalent replacement, or improvement made within the spirit and principle of this application shall fall within the protection scope of this application.

What is claimed is:

1. A node device operation method, performed at a first node device having one or more processors and memory storing a plurality of programs to be executed by the one or more processors, wherein the first node device is a member of a network system of node devices, the method comprising:

receiving, by the first node device, voting requests from a plurality of second node devices, a quantity of the plurality of second node devices being greater than half of a quantity of node devices among the network system of node devices;

when the first node device operates in a leader state, obtaining, by the first node device, cycle length information and latest log indexes from the voting requests of the plurality of second node devices; and switching, by the first node device, a work status of the first node device from the leader state to a follower state or a candidate state when (i) all the cycle length information in the voting requests of the plurality of second node devices is greater than cycle length information of the first node device and (ii) all the latest log indexes in the voting requests of the plurality of second node devices are not less than a latest log index of the first node device.

2. The method according to claim 1, wherein the receiving voting requests of a plurality of second node devices comprises:
after a first voting request from one of the plurality of second node devices is received, starting a timer for timing; and
during an operation process of the timer, continuing receiving a next voting request from a next one of the plurality of second node devices until the timer expires.

3. The method according to claim 1, further comprising:
after receiving voting requests from a plurality of second node devices,
obtaining, by the first node device, the cycle length information and the latest log indexes from the voting requests of the plurality of second node devices if the first node device operates in the follower state; and
switching, by the first node device, the work status of the first node device from the follower state to a candidate state or keeping the follower state when (i) all the cycle length information in the voting requests of the plurality of second node devices is greater than the cycle length information of the first node device and (ii) all the latest log indexes in the voting requests of the plurality of second node devices are not less than the latest log index of the first node device.

4. The method according to claim 1, further comprising:
after switching a work status of the first node device from the leader state to a follower state or a candidate state:
determining a destination node device according to the voting requests of the plurality of second node devices; and
sending a voting acknowledge message to the destination node device in response to a voting request of the destination node device.

5. The method according to claim 1, further comprising:
after switching a work status of the first node device from the leader state to a follower state or a candidate state:
receiving heartbeat information broadcast by a node device operating in the leader state.

6. The method according to claim 1, further comprising:
after switching a work status of the first node device from the leader state to a follower state or a candidate state:
receiving a log copy instruction broadcast by a node device operating in the leader state, and copying a log based on the log copy instruction.

7. A first node device comprising one or more processors, memory coupled to the one or more processors and a plurality of programs stored in the memory, wherein the first node device is a member of a network system of node devices, and the plurality of programs, when executed by the one or more processors, cause the first node device to perform a plurality of operations comprising:
receiving, by the first node device, voting requests from a plurality of second node devices, a quantity of the plurality of second node devices being greater than half of a quantity of node devices among the network system of node devices;
when the first node device operates in a leader state, obtaining, by the first node device, cycle length information and latest log indexes from the voting requests of the plurality of second node devices; and
switching, by the first node device, a work status of the first node device from the leader state to a follower state or a candidate state when (i) all the cycle length information in the voting requests of the plurality of second node devices is greater than cycle length information of the first node device and (ii) all the latest log indexes in the voting requests of the plurality of second node devices are not less than a latest log index of the first node device.

8. The first node device according to claim 7, wherein the receiving voting requests of a plurality of second node devices comprises:
after a first voting request from one of the plurality of second node devices is received, starting a timer for timing; and
during an operation process of the timer, continuing receiving a next voting request from a next one of the plurality of second node devices until the timer expires.

9. The first node device according to claim 7, wherein the plurality of operations further comprise:
after receiving voting requests from a plurality of second node devices,
obtaining, by the first node device, the cycle length information and the latest log indexes from the voting requests of the plurality of second node devices if the first node device operates in the follower state; and
switching, by the first node device, the work status of the first node device from the follower state to a candidate state or keeping the follower state when (i) all the cycle length information in the voting requests of the plurality of second node devices is greater than the cycle length information of the first node device and (ii) all the latest log indexes in the voting requests of the plurality of second node devices are not less than the latest log index of the first node device.

10. The first node device according to claim 7, wherein the plurality of operations further comprise:
after switching a work status of the first node device from the leader state to a follower state or a candidate state:
determining a destination node device according to the voting requests of the plurality of second node devices; and
sending a voting acknowledge message to the destination node device in response to a voting request of the destination node device.

11. The first node device according to claim 7, wherein the plurality of operations further comprise:
after switching a work status of the first node device from the leader state to a follower state or a candidate state:
receiving heartbeat information broadcast by a node device operating in the leader state.

12. The first node device according to claim 7, wherein the plurality of operations further comprise:
after switching a work status of the first node device from the leader state to a follower state or a candidate state:
receiving a log copy instruction broadcast by a node device operating in the leader state, and copying a log based on the log copy instruction.

13. A non-transitory computer readable storage medium storing a plurality of machine readable instructions in connection with a first node device having one or more processors, wherein the first node device is a member of a network system of node devices, and the plurality of machine readable instructions, when executed by the one or more processors, cause the first node device to perform a plurality of operations including:

- receiving, by the first node device, voting requests from a plurality of second node devices, a quantity of the plurality of second node devices being greater than half of a quantity of node devices among the network system of node devices;
- when the first node device operates in a leader state, obtaining, by the first node device, cycle length information and latest log indexes from the voting requests of the plurality of second node devices; and
- switching, by the first node device, a work status of the first node device from the leader state to a follower state or a candidate state when (i) all the cycle length information in the voting requests of the plurality of second node devices is greater than cycle length information of the first node device and (ii) all the latest log indexes in the voting requests of the plurality of second node devices are not less than a latest log index of the first node device.

14. The non-transitory computer readable storage medium according to claim 13, wherein the receiving voting requests of a plurality of second node devices comprises:

- after a first voting request from one of the plurality of second node devices is received, starting a timer for timing; and
- during an operation process of the timer, continuing receiving a next voting request from a next one of the plurality of second node devices until the timer expires.

15. The non-transitory computer readable storage medium according to claim 13, wherein the plurality of operations further comprise:

- after receiving voting requests from a plurality of second node devices,
  - obtaining, by the first node device, the cycle length information and the latest log indexes from the voting requests of the plurality of second node devices if the first node device operates in the follower state; and
- switching, by the first node device, the work status of the first node device from the follower state to a candidate state or keeping the follower state when (i) all the cycle length information in the voting requests of the plurality of second node devices is greater than the cycle length information of the first node device and (ii) all the latest log indexes in the voting requests of the plurality of second node devices are not less than the latest log index of the first node device.

16. The non-transitory computer readable storage medium according to claim 13, wherein the plurality of operations further comprise:

- after switching a work status of the first node device from the leader state to a follower state or a candidate state:
  - determining a destination node device according to the voting requests of the plurality of second node devices; and
  - sending a voting acknowledge message to the destination node device in response to a voting request of the destination node device.

17. The non-transitory computer readable storage medium according to claim 13, wherein the plurality of operations further comprise:

- after switching a work status of the first node device from the leader state to a follower state or a candidate state:
  - receiving heartbeat information broadcast by a node device operating in the leader state.

18. The non-transitory computer readable storage medium according to claim 13, wherein the plurality of operations further comprise:

- after switching a work status of the first node device from the leader state to a follower state or a candidate state:
  - receiving a log copy instruction broadcast by a node device operating in the leader state, and copying a log based on the log copy instruction.

* * * * *